United States Patent [19]
Andrepont et al.
[11] Patent Number: 4,987,922
[45] Date of Patent: Jan. 29, 1991

[54] STORAGE TANK FOR TWO FLUIDS OF DIFFERENT DENSITY

[75] Inventors: John S. Andrepont, Naperville; Robert S. Wozniak, Elmhurst, both of Ill.; Chapin O. Saint, Spring, Tex.
[73] Assignee: Chicago Bridge & Iron Technical Services Company, Oak Brook, Ill.

[21] Appl. No.: 340,704
[22] Filed: Apr. 20, 1989
[51] Int. Cl.[5] .............. F17C 13/00
[52] U.S. Cl. .............. 137/592; 137/590
[58] Field of Search .............. 137/172, 590, 592

[56] References Cited

U.S. PATENT DOCUMENTS 4,315,404 2/1982 Schmitt et al. .............. 60/690
4,449,368 5/1984 Haynie .............. 60/652
4,643,212 2/1987 Rothrock .............. 137/1

OTHER PUBLICATIONS

Roger L. Cole and Frank O. Bellinger "Storing Solar Energy in Thermally Stratified Tanks", pp. 2074–2079, 17th IECEC, copyright 1982 IEEE.

*Primary Examiner*—John Rivell
*Attorney, Agent, or Firm*—Marshall, O'Toole, Gerstein, Murray & Bicknell

[57] ABSTRACT

An enclosed storage tank for the simultaneous addition and removal, and storage, or two liquid layers of different density comprising a tank shell having a bottom, a side wall extending upwardly from the bottom, a roof supported at least in part by the side wall and at least one vertical tubular column extending upwardly from the shell bottom to at least close to the roof; a substantially horizontal first distributor plate above which the column extends and with the plate spaced above but adjacent to the shell bottom; first openings in the column between the first distributor plate and the shell bottom; a high density liquid conduit extending from outside the shell to the column interior whereby high density liquid can be fed to the column interior and then flow out the first openings into the lower portion of the tank beneath the first distributor plate and the high density liquid can be withdrawn from the tank through the first openings and then through the high density liquid conduit; a substantially horizontal second distributor plate above and below which the column extends and with the second distributor plate spaced below but adjacent to the shell roof; second openings in the column between the second distributor plate and shell roof; a low density liquid conduit extending from outside the shell into communication with the column interior whereby low density liquid can be fed to the column interior and then flow out the second openings into the upper portion of the tank above the second distributor plate while high density liquid is withdrawn from the tank through the high density liquid conduit, and the low density liquid can be withdrawn from the tank through the second openings and then through the low density liquid conduit while the high density liquid is fed to the tank through the high density liquid conduit.

32 Claims, 4 Drawing Sheets

10 22 18 24 20 60 52 20 64 54 56 58 200 16 30 100 40 38 46 36 50 44 42 32 34 14 12

136
18
20
22
134
20
132
130
128
128
140
4.
4.
142
128
142
144
127
126
144
124
146
146
148
148
80
50
122
120
112
112
36
40
118
110
110
5.
5.
114
108
94
98
88
86
98
94
108
92
84
84
84
92
90
82
14

144
140
144
6
6
142
80
142
144
132
126
144
144

108
96
110
110
92
92
94
90
96
94
94
98
98
110
108
94
92
80
86
92
96
114
89
98
96
94
110
94
88
92
92
92
92
92
108

142
142
144
146

STORAGE TANK FOR TWO FLUIDS OF DIFFERENT DENSITY

This invention relates to apparatus and methods of storing two liquids of different densities in contact with each other in the same storage tank and the simultaneous removal of one of the liquids from the tank while the other liquid is fed into the tank.

BACKGROUND OF THE INVENTION

It is recognized as useful to be able to store two liquids of different density under conditions which maintain them essentially separate, even when the composition of both liquids is identical. Such separation can be achieved by two independent vessels, a single vessel with internal compartmentalization, a vessel with simple or labyrinthine fixed baffles, a vessel with a movable rigid baffle or a vessel with a flexible diaphragm or membrane. Such systems, however, have technical, operational or economic drawbacks.

A more desirable system is to maintain separation of the two different density liquids as separate layers by stratification with the lower density liquid layer above the higher density liquid layer. Even though the density of the two liquids is different, they have the same composition. This can occur because the density of the liquid used increases as its temperature decreases and the density decreases as its temperature increases. Examples of such liquids, at least over some of the most useful temperature ranges, are water, aqueous solutions of organic liquids such as methanol and ethylene glycol, aqueous solutions of inorganic salts such as sodium chloride, carbon dioxide, oil and molten salts. Such liquids are stored in stratified layers as sources of thermal energy and for refrigeration and for cooling purposes. See, for example, the U.S. Pat. Nos. 4,449,368; of Haynie 4,315,404; Schmitt et al. and 4,643,212 Rothrock.

When the lower cold layer is used for refrigeration or cooling, a stream of the cold liquid is withdrawn, used for cooling and then returned warm or hot, and at a lower density, to the top layer while cold liquid is simultaneously removed from the bottom layer. In this way, essentially the entire stored volume can be used for cooling so that the entire liquid content returned to the tank becomes heated. At an appropriate time the warm or hot liquid can be withdrawn from the tank and cooled and then returned to the tank as a lower stratified cold layer of higher density with a hot layer of lower density on top unless, of course, cooling continues until all of the hot liquid in the tank is withdrawn and returned as cold liquid.

Maintaining the described stratification of the two liquid layers having different densities requires that the liquids be withdrawn and fed to the tank without promoting undue mixing a the tank inlet and outlet and at the interface of the two liquids. The desired result can be achieved by the use of manifolds, usually including a myriad of nozzles, ports, holes, slots, perforations or other openings but they have been determined to be cumbersome and costly in fabrication, support, erection and maintenance. Accordingly, there is a need for simpler apparatus and methods for storing such stratified liquids in a tank and then simultaneously removing liquid of one density from the tank while feeding liquid of a second density to the tank.

SUMMARY OF THE INVENTION

According to the invention an enclosed storage tank for the simultaneous addition and removal, and storage, of two liquid layers of different density is provided comprising a tank shell having a bottom, a side wall extending upwardly from the bottom, a roof supported at least in part by the side wall and by at least one vertical tubular column extending upwardly from the shell bottom to at least close to the roof; a substantially horizontal first liquid distributor means above which the column extends and spaced above the shell bottom; first opening means in the column between the first liquid distributor means and the shell bottom; a high density liquid conduit extending from outside the shell into communication with the column interior whereby high density liquid can be fed to the column interior and then flow out the first opening means into the lower portion of the tank beneath the first liquid distributor means and the high density liquid can be withdrawn from the tank through the first opening means and then through the high density liquid conduit; a substantially horizontal second liquid distributor means above and below which the column extends and with the second liquid distributor means spaced below the shell roof; second opening means in the column between the second liquid.distributor means and the shell roof; a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed t the tank through the high density liquid conduit.

One or both of the first and second liquid distributor means can be plates, especially circular plates.

The first opening means and the second opening means can include openings or ports substantially uniformly spaced around the column periphery. Also, the column can be circular in horizontal section.

A bulkhead can be positioned inside the column to prevent the low density liquid from contacting the high density liquid in the column.

A horizontal vortex breaker plate, through which the column extends, can be positioned above, but adjacent to, the second opening means.

The enclosed storage tank can have a predetermined minimum liquid storage capacity which places the liquid level above the second opening means.

The high density liquid conduit can communicate with the column below the bulkhead and the low density liquid conduit can communicate with the column above the bulkhead.

The tank shell can be made of metal or wholly or partly of non-metallic material, and the bottom can be flat and circular, the side wall can be cylindrical and circular in section and the roof periphery can be circular.

In use the tank can be filled to at least a minimum storage capacity with a top layer of a low density liquid and a bottom layer of a high density liquid and the two liquids can have the same composition but be at different temperatures.

The invention also provides a method for simultaneously adding and/or withdrawing low density and high density liquids from the tank.

DETAILED DESCRIPTION OF THE DRAWINGS

To the extent it is reasonable and practical the same or similar elements which appear in the various drawing figures will be identified by the same numbers.

Figure 1:
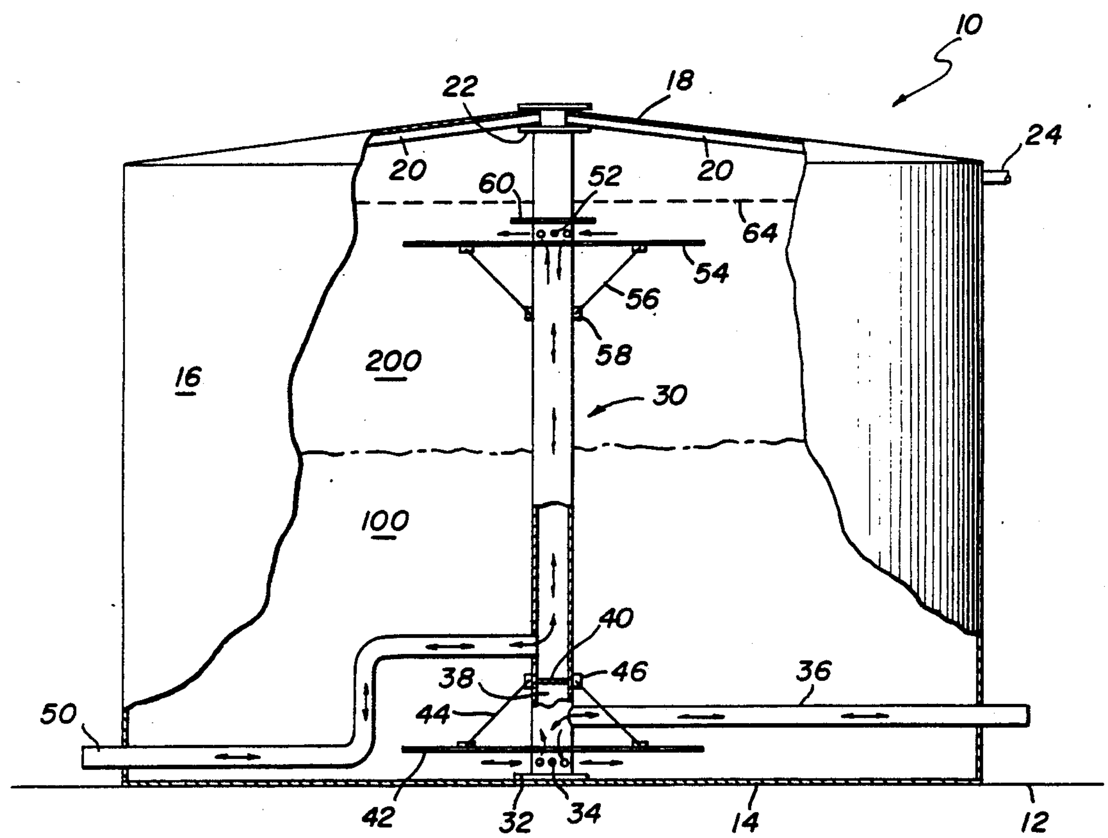
FIG. 1 is a side elevational view, partially broken away and in section, of one embodiment of a storage tank provided by the invention.
Figure 2:
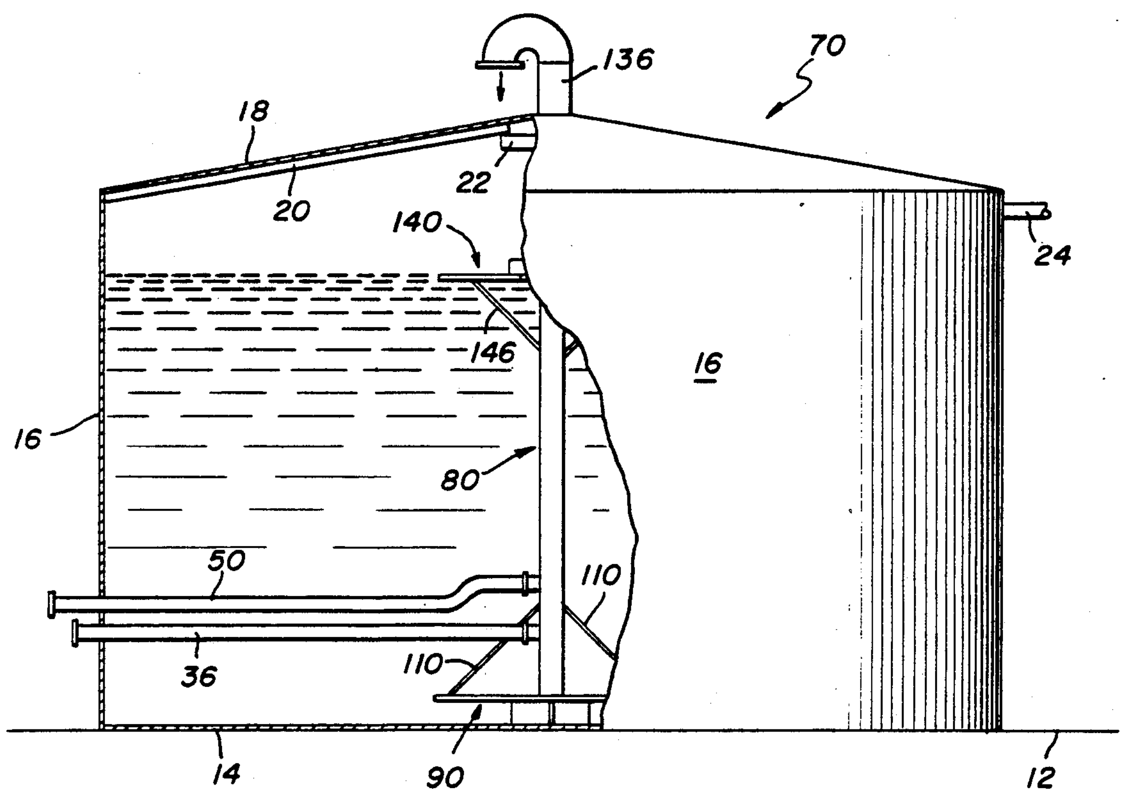
FIG. 2 is a side elevational view, partially broken away and in section, of a second embodiment of a storage tank provided by the invention.

FIG. 1 illustrates a enclosed storage tank 10 supported on a foundation or ground 12. The tank has a flat circular metal bottom 14 and a circular cylindrical side wall 16 and a conical roof 18 which is supported by beams 20 which have their inner ends supported by ring 22 on the upper portion of column 30. An overflow outlet pipe 24 is positioned in the top of side wall 16 slightly above the maximum liquid storage capacity of the tank.

The column 30 has a circular base plate 32 mounted on the center of tank bottom 14. The column 30 is a vertical hollow tube which is circular in horizontal section. Slightly above base plate 32 the column 30 has a plurality of holes or openings 34 which permit high density liquid 100 to be fed into and out of the lower part of column 30. Pipe 36 extends from outside of tank side wall 16 into liquid communication with the interior lower part 38 of column 30 below baffle plate 40 which extends completely across the interior horizontal area of the column and thereby prevents passage of liquid past the baffle. High density liquid fed by pipe 36 into the column lower part 38 flows out holes 34 below a first circular horizontal liquid distributor plate 42 supported by rods 44 attached to gussets 46 positioned radially on the outside of column 30.

The removal of high density liquid from tank 10 is achieved by having it flow through holes 34 into column 30 and out through pipe 36. Thus, pipe 36 functions as an inlet pipe and an outlet pipe.

Pipe 50 extends from outside of tank 10 into liquid communication with the interior part of column 30 above baffle 40. Pipe 50 is used to feed lower density liquid into, and withdraw it from, the tank 10. When lower density liquid 200 is fed by pipe 50 into column 30 the liquid flows upwardly in the column until it reaches the plurality of radially positioned holes 52. The lower density liquid 200 flows out of the column through holes 52 into the upper space of the tank but above the second or upper horizontal circular liquid distributor plate 54. The second distributor plate is connected to column 30 and is further supported by rods 56 which are joined to radial gussets 58 on the side of column 30.

A horizontal circular anti-vortex plate 60 is axially mounted on column 30 above the holes 52.

To increase the stored volume of a higher density liquid 100, which can be cold water, in tank 10 the higher density liquid can be fed into the tank through pipe 36. Simultaneously, an equal volume of a lower density liquid, which can be hot water, is removed from the tank through pipe 50 while the nominal maximum liquid capacity of the tank is maintained at level 64 located slightly below overflow outlet 24. By reversing the described procedure the volume of higher density water in the tank can be increased.

The described embodiment of the invention uses the column 30 as the liquid riser or fluid conduit for the inlet and outlet flow of liquid to and from the distribution plates. This arrangement uses less material and is more economical to fabricate and erect than others which might be used. Another advantage of the column 30 is that it simultaneously serves to support roof 18. Furthermore, the primary liquid flow side or surface of each of the distributor plates 42,54 is essentially smooth, thus permitting the radial liquid flow desired for optimum liquid distribution.

The small anti-vortex plate 60 functions as a liquid vortex breaker when lower density liquid is withdrawn from the tank and as a splash plate during addition of lower density liquid, such as warm water.

For insulation purposes the tank bottom 14, side wall 16 and roof 18 can be externally or internally insulated. The column 30 can be similarly insulated as can the internal flow conduits 36 and 50, as well as baffle 40. Baffle 40, if desired, can constitute two horizontal vertically spaced apart plates to thereby obtain an insulating effect. Furthermore, the tank and all other elements therein can be made wholly or partially of nonmetallic materials such as polypropylene, polyvinylchloride or of a glass fiber-containing solid polymeric material.

The tank 10 is especially useful for thermal energy storage of a liquid which changes density with change in temperature, such as water, salt water, natural or synthetic oils, molten salts, carbon dioxide, lower alcohols such as methanol and ethanol, liquefied natural gas, liquid hydrocarbons and liquid metals in pure form or as mixtures. The tank 10 is also useful for storing two chemically different liquids having different densities. In both cases, however, the liquid volumes remain separated by stratification with the lower density liquid volume stratified on top of the higher density liquid volume.

With reference to the second embodiment of the invention as illustrated in FIGS. 2 to 6, the tank 70 is supported on a foundation or earth 12. The tank 70 also has a flat circular metal bottom 14, a circular cylindrical side wall 16 and a conical roof 18 which is supported by radial beams 20 which have their inner ends supported by ring 22 on the upper portion of vertical column 80. The column 80 is mounted in alignment with the vertical center of tank bottom 14. An overflow outlet pipe 24 is positioned in the top of side wall 16 of tank 70 at the maximum liquid storage capacity of the tank.

Beneath the lower end of column 80, and mounted on the upper surface of tank bottom plate 14, is a circular base plate 82 in contact with plate 14. A series of eight radially positioned vertical plates 84 extend outwardly from the vertical axis of column 80 which is also the vertical axis of the tank. Adjacent plates 84 are angularly equally spaced apart. Circular horizontal plate 86 is supported on the top of radial vertical plates 84. A circular axially located hole 88 (FIG. 5) is located in circular plate 86 so as to provide liquid communication between the column 80 internal lower space and the column external space.

A circular ring plate 90 is axially mounted on top of plate 86. The ring plate 90 has a circular hole 89 (FIG. 5) with a diameter somewhat less than the outer diameter of circular plate 86 thereby providing supporting contact between the two plates. Each horizontal ring plate 90 is fabricated from either identically sized and shaped plates 92, each in the general shape of a sector of a circle. The two radial edge portions 94 of each circular sector plate 92 are bent vertically upwardly and the adjacent edge portions 94 of each circular sector 92 are joined together by bolts 96. The ring plate 90 can be provided with hatches or other closeable openings to permit access below the plate for inspection, painting and other maintenance.

Eight equally spaced apart vertical bars 98 ar joined along the perimeter of circular plate 86. Each bar 98 fits into a slot on the inner edge of a circular sector 92. The bar 98 is then joined to the respective circular sector 92.

Eight equally spaced apart bars 108 (FIG. 5) are located around the perimeter of ring plate 90. The lower end of an angle bar brace 110 is bolted to each bar 108 and the upper end of each brace 110 is bolted to one of the gussets 112 on the column tubular portion 120.

Plate 86 and the ring plate 90 fabricated as described together constitute a liquid distributor plate.

Figure 3:
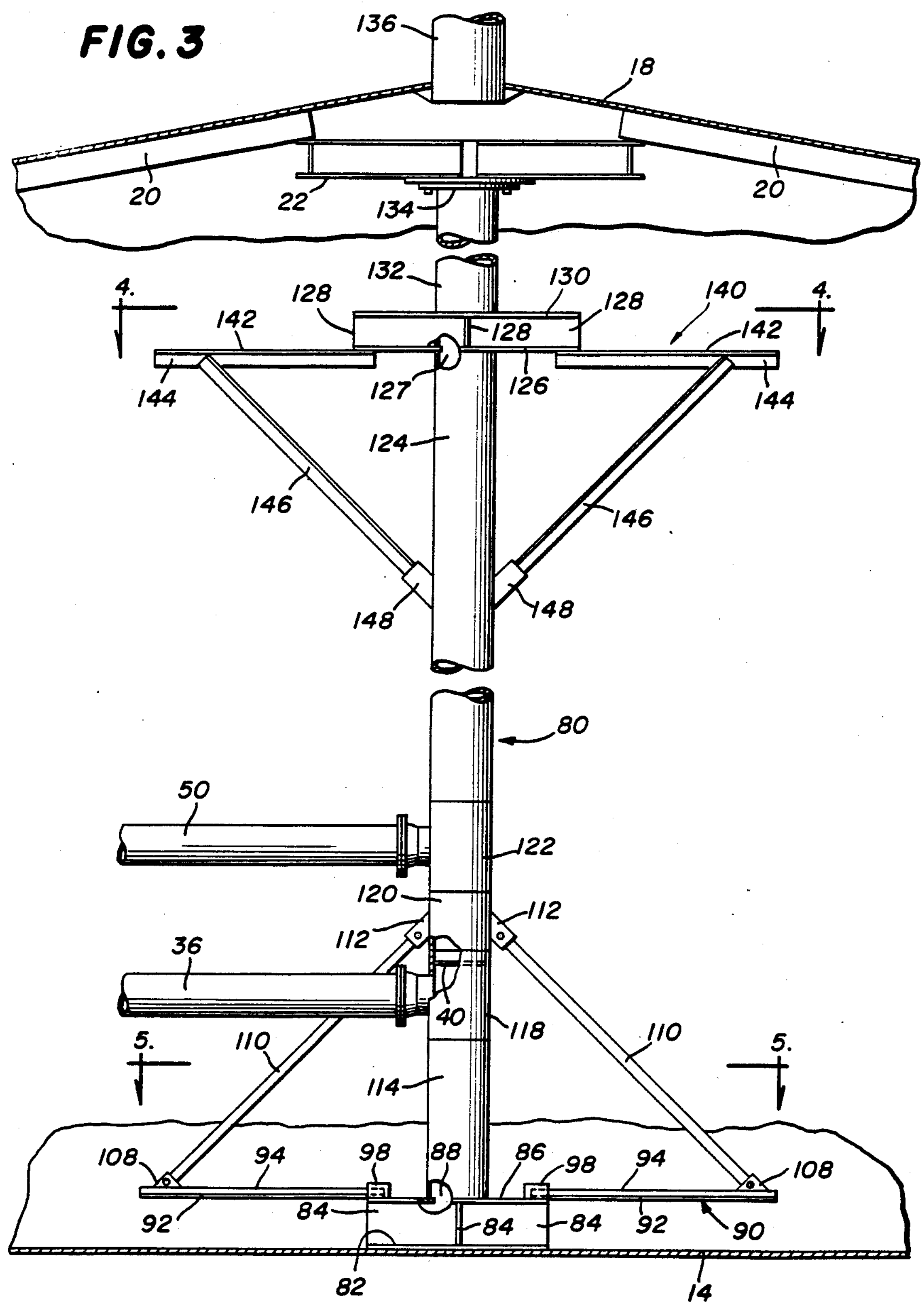
FIG. 3 is an enlarged elevational view of the central portion of the storage tank shown in FIG. 2.

The column 80 includes a lower tubular portion 114 which rests on plate 86. A reducing Tee 118 is joined to the top of tubular portion 114 (FIG. 3). Horizontal circular wall plate 40 is positioned in the upper part of Tee 118 to prevent liquid flow in either direction past the plate. Liquid conduit pipe 36 is connected to the side opening of Tee 118. The column tubular portion 120 is joined to the top of Tee 118 and, in turn, Tee 122 is joined to the top of tubular portion 120. Liquid conduit pipe 50 is connected to the side opening of Tee 122 (FIG. 3).

Column 80 tubular portion 124 is joined at the bottom to the top of Tee 122. Circular plate 126 is mounted axially and horizontally on the top of column portion 124 (FIG. 3). Plate 126 is provided with a centrally located circular hole 127 slightly smaller than the internal diameter of column portion 124. Eight radially positioned and angularly equally spaced apart vertical plates 128 are joined to the top of plate 126. Circular horizontal plate 130 is axially positioned, with respect to tubular portion 124, on top of and is joined to the vertical plates 128.

Column tubular portion 132 is axially joined to the top of plate 130. A circular plate 134, joined to the top of column tubular portion 132, closes off the top of the column. The roof supporting ring 22 and associated structure is in turn joined to, and supported by, plate 134. Vent pipe 136 is centrally mounted in the tank roof 18 and it communicates with the tank upper interior space and the exterior atmosphere.

Figure 4:
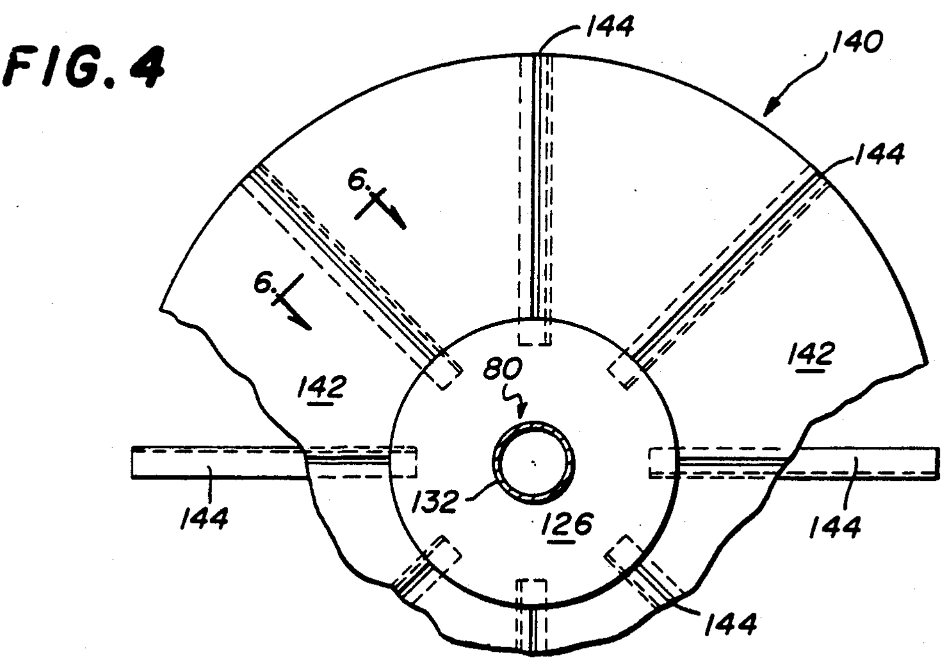
FIG. 4 is a sectional view taken along the line 4—4 of FIG. 3.
Figure 5:
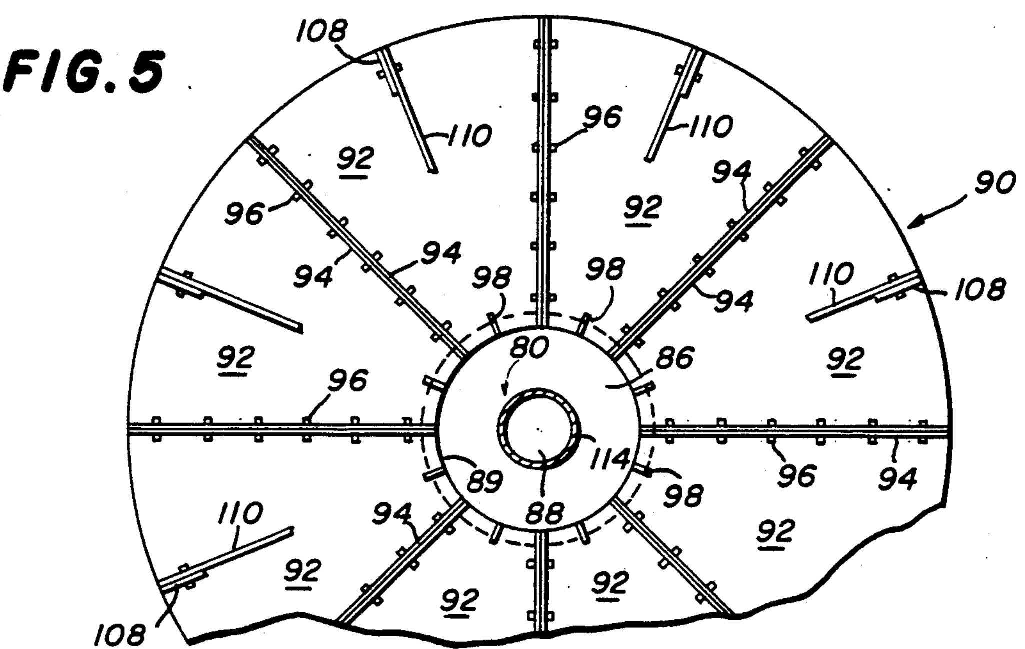
FIG. 5 is a sectional view taken along the line 5—5 of FIG. 4.
Figure 6:
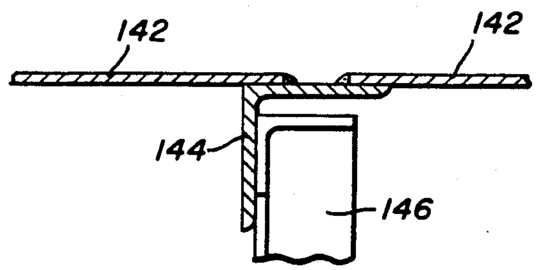
FIG. 6 is a sectional view taken along the line 6—6 of FIG. 4.

A horizontal ring plate 140 (FIGS. 3 and 4) is axially positioned and joined to the bottom perimeter of plate 126. The plate 140 can be fabricated or assembled from eight identically sized and shaped plates 142, each in the general shape of a sector of a circle. The adjacent radial edges of a pair of adjoining sector plates 142 are supported by a radially positioned angle member 144 (FIGS. 4 and 6).

The horizontal ring plate 140 can be supported by eight braces 146. The upper end of each brace 146 is connected to an angle member 144 and the lower end of the brace 146 is connected to a gusset 148 joined to column tubular section 124.

The circular plate 130 functions as a splash plate when liquid is supplied to the tank by means of pipe 50. When liquid is withdrawn from the tank by means of pipe 50 the plates 126, 130 and 128 in combination function as a vortex breaker. Plate 126 and ring plate 140 taken together also function as a distributor plate when liquid is fed to the tank through either pipe 36 or 50 and column 80.

It will be seen that the second embodiment of the invention eliminates use of the holes 34 and 52 present in the first embodiment (FIG. 1) to supply liquid to the tank and to remove liquid from the tank. The liquid feed and removal means in the upper part of the tank comprising plates 126, 128, 130, and in the lower part of the tank comprising plates 82, 84, 86, give a more uniform radial flow of liquid than does the use of holes 34, 52 in the first embodiment (FIG. 1).

The operation of the second embodiment of the invention as illustrated by FIGS. 2 to 6 is essentially the same as for the first embodiment illustrated by FIG. 1 and which has been previously explained herein. That explanation can be referred to thus making it unnecessary to repeat it again.

It is also within the scope of the invention to use a plurality of columns in a tank and to provide each column with apparatus as described above in respect to the first and/or second embodiments of the invention.

Any and all of parts of the tank can be thermally insulated and also many parts can be fabricated of insulating construction materials, especially the columns-30, 80, feed pipes 36, 50, bulkheads 40, braces 110, 146 and plates 82, 84, 86, 92 as well as plates 126, 128, 130 and 142.

The foregoing detailed description has been given for clearness of understanding only, and no unnecessary limitations should be understood therefrom, as modifications will be obvious to those skilled in the art.

What is claimed is:

1. An enclosed storage tank for the simultaneous addition and removal, and storage, of two liquid layers of different density comprising:

a tank shell having a bottom, a side wall extending upwardly from the bottom, a roof supported at least in part by the side wall and at least one vertical tubular column extending upwardly from the shell bottom to at least close to the roof;

a substantially horizontal first liquid distributor means, spaced around and extending outwardly of the column periphery, above which the column extends and spaced above the shell bottom;

a plurality of first openings in the column between the first liquid distributor means and the shell bottom;

a high density liquid conduit extending from outside the shell into communication with the column interior whereby high density liquid can be fed to the column interior and then flow out the first opening means into the lower portion of the tank beneath the first distributor means and the high density liquid can be withdrawn from the tank through the first opening means and then through the high density liquid conduit;

a substantially horizontal second liquid distributor means above and below which the column extends and with the second liquid distributor means spaced below the shell roof;

second opening means in the column between the second liquid distributor means and the shell roof;

a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed to the tank through the high density liquid conduit.

2. An enclosed storage tank according to claim 1 in which the first and second liquid distributor means are plates.

3. An enclosed storage tank according to claim 1 in which the first opening means and the second opening means are substantially uniformly spaced around the column periphery.

4. An enclosed storage tank according to claim 1 in which the column is circular in horizontal section.

5. An enclosed storage tank according to claim 1 in which a bulkhead is positioned inside the column to prevent the low density liquid from contacting the high density liquid in the column.

6. An enclosed storage tank according to claim 1 having a predetermined minimum liquid storage capacity which places the liquid level above the second opening means.

7. An enclosed storage tank according to claim 5 in which the high density liquid conduit communicates with the column below the bulkhead and the low density liquid conduit communicates with the column above the bulkhead.

8. An enclosed storage tank according to claim 1 in which the shell is made of metal, the bottom is essentially flat and circular, the side wall is cylindrical and the roof periphery is circular.

9. An enclosed storage tank according to claim 6 in which the tank is filled to at least minimum storage capacity with a top layer of a low density liquid and a bottom layer of a high density liquid and the two liquids have the same composition but are at different temperatures.

10. An enclosed storage tank according to claim 1 in which the first liquid distributor means is detachable and movable.

11. A method for the simultaneous addition and removal of two liquid layers of different density to and from an enclosed storage tank;

the storage tank constituting a tank shell having a bottom, a side wall extending upwardly from the bottom, a roof supported by the side wall and at least one vertical tubular column extending upwardly from the shell bottom to the roof; a substantially horizontal first liquid distributor means, spaced around and extending outwardly of the column periphery, above which the column extends and spaced above the shell bottom; first opening means in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; second opening means in the column between the second liquid distributor means and the shell roof; and a low density liquid conduit extending from outside the shell into communication with the column interior;

the tank having a stratified volume of low density liquid on top of a volume of high density liquid;

The method comprising feeding high density liquid through the high density liquid conduit to the column interior so that it can flow out the first opening means into the lower portions of the tank beneath the first liquid distributor means while simultaneously withdrawing low density liquid from the tank above the second liquid distributor means, through the second opening means and then through the column to the low density liquid conduit while the high density liquid is fed to the tank through the high density liquid conduit.

12. A method for the simultaneous addition and removal of two liquid stratified volumes of different density to and from an enclosed storage tank;

the storage tank constituting a tank shell having a bottom, a side wall extending upwardly from the bottom, a roof supported at least in part by the side wall and at least one vertical tubular column extending upwardly from the shell bottom to the roof; a substantially horizontal first liquid distributor means, spaced around and extending outwardly of the column periphery, above which the column extends and spaced above the shell bottom; a plurality of first openings in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; a plurality of second openings in the column between the second liquid distributor means and the shell roof; and a low density liquid conduit extending from outside the shell into communication with the column interior;

the tank having a stratified volume of low density liquid on top of a volume of high density liquid;

the method comprising feeding low density liquid through the low density liquid conduit to the column interior so that it can flow out the second opening means into the upper portion of the tank above the second liquid distributor means while simultaneously withdrawing high density liquid from the tank below the first liquid distributor means and through the second opening means and then through the column to the high density liquid conduit while the low density liquid is fed to the tank through the low density liquid conduit.

13. A method according to claim 11 or 12 in which the first and second liquid distributor means are circular plates.

14. A method according to claim 11 or 12 in which the first opening means and the second opening means are substantially uniformly spaced around the column periphery.

15. A method according to claim 11 or 12 in which a bulkhead is positioned inside the column to prevent the low density liquid from contacting the high density liquid in the column.

16. A method according to claim 11 or 12 having a predetermined minimum liquid storage capacity which places the liquid level above the second opening means.

17. A method according to claim 16 in which the tank is filled to at least minimum storage capacity with a top layer of a low density liquid and a bottom layer of a high density liquid and the two liquids have the same composition but are at different temperatures.

18. A method according to claim 11 or 12 in which the first liquid distributor means is a detachable and movable plate.

19. An enclosed storage tank for the simultaneous addition and removal, and storage, of two liquid layers of different density comprising:

a tank shell having a bottom, a side wall extending upwardly from the bottom, a roof supported at least in part by the side wall and at least one vertical tubular column extending upwardly from the shell bottom to at least close to the roof;

a substantially horizontal first liquid distributor means above which the column extends and spaced above the shell bottom;

a plurality of first openings in the column between the first liquid distributor means and the shell bottom;

a high density liquid conduit extending from outside the shell into communication with the column interior whereby high density liquid can be fed to the column interior and then flow out the first opening means into the lower portion of the tank beneath the first distributor means and the high density liquid can be withdrawn from the tank through the first opening means and then through the high density liquid conduit;

a substantially horizontal second liquid distributor means above and below which the column extends and with the second liquid distributor means spaced below the shell roof;

second opening means in the column between the second liquid distributor means and the shell roof;

a vortex assembly, above and below which the column extends, positioned above but adjacent to the second opening means; and a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed to the tank through the high density liquid conduit.

20. An enclosed storage tank for the simultaneous addition and removal, and storage, of two liquid layers of different density comprising:

a tank shell having a bottom, a side wall extending upwardly from the bottom, a roof supported at least in part by the side wall and at least one vertical tubular column extending upwardly from the shell bottom to at least close to the roof;

a substantially horizontal first liquid distributor means above which the column extends and spaced above the shell bottom;

a plurality of first openings in the column between the first liquid distributor means and the shell bottom;

a high density liquid conduit extending from outside the shell into communication with the column interior whereby high density liquid can be fed to the column interior and then flow out the first opening means into the lower portion of the tank beneath the first distributor means and the high density liquid can be withdrawn from the tank through the first opening means and then through the high density liquid conduit;

a substantially horizontal second liquid distributor means above and below which the column extends and with the second liquid distributor means spaced below the shell roof;

second opening means in the column between the second liquid distributor means and the shell roof;

a vortex assembly, above and below which the column extends, positioned above but adjacent to the second opening means;

a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed to the tank through the high density liquid conduit; and a bulkhead positioned inside the column to prevent the low density liquid from contacting the high density liquid in the column.

21. An enclosed storage tank for the simultaneous addition and removal, and storage, of two liquid layers of different density comprising:

a tank shell having a bottom, a side wall extending upwardly from the bottom, a roof supported at least in part by the side wall and at least one vertical tubular column extending upwardly from the shell bottom to at least close to the roof;

a substantially horizontal first liquid distributor means above which the column extends and spaced above the shell bottom;

a plurality of first openings in the column between the first liquid distributor means and the shell bottom;

a high density liquid conduit extending from outside the shell into communication with the column interior whereby high density liquid can be fed to the column interior and then flow out the first opening means into the lower portions of the tank beneath the first distributor means and the high density liquid can be withdrawn from the tank through the first opening means and then through the high density liquid conduit;

a substantially horizontal second liquid distributor means above and below which the column extends and with the second liquid distributor means spaced below the shell roof;

an anti-splash means above the second liquid distributor means;

second opening means in the column between the second distributor means and the shell roof; and a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed to the tank through the high density liquid conduit.

22. An enclosed storage tank for the simultaneous addition and removal, and storage, of two liquid layers of different density comprising:

a tank shell having a bottom, a side wall extending upwardly from the bottom, a roof supported at least in part by the side wall and at least one vertical tubular column extending upwardly from the shell bottom to at least close to the roof;

a substantially horizontal first liquid distributor means above which the column extends and spaced above the shell bottom;

a plurality of first openings in the column between the first liquid distributor means and the shell bottom;

a high density liquid conduit extending from outside the shell into communication with the column interior whereby high density liquid can be fed to the column interior and then flow out of the first opening means into the lower portions of the tank beneath the first distributor means and the high density liquid can be withdrawn from the tank through the first opening means and then through the high density liquid conduit;

a substantially horizontal second liquid distributor means above and below which the column extends and with the second liquid distributor means spaced below the shell roof;

second opening means in the column between the second distributor means and the shell roof;

a vortex breaker assembly, above and below which the column extends, positioned above but adjacent to the second means;

the vortex breaker assembly including a splash plate; and a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed to the tank through the high density liquid conduit.

23. An enclosed storage tank for the simultaneous addition and removal, and storage, of two liquid layers of different density comprising:

a tank shell having a bottom, a side wall extending upwardly from the bottom, a roof supported at least in part by the side wall and at least one vertical tubular column extending upwardly from the shell bottom to at least close to the roof;

a substantially horizontal first liquid distributor means above which the column extends and spaced above the shell bottom;

a plurality of first openings in the column between the first liquid distributor means and the shell bottom;

a high density liquid conduit extending from outside the shell into communication with the column interior whereby high density liquid can be fed to the column interior and then flow out the first opening means into the lower portion of the tank beneath the first distributor means and the high density liquid can be withdrawn from the tank through the first opening means and then through the high density liquid conduit;

a substantially horizontal second liquid distributor means above and below which the column extends and with the second liquid distributor means spaced below the shell roof;

second opening means in the column between the second liquid distributor means and the shell roof;

a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed to the tank through the high density liquid conduit; and the column including a pair of piping Tee fittings with the high density liquid conduit communicating with one of the Tees and the low density liquid conduit communicating with the other Tee.

24. An enclosed storage tank for the simultaneous addition and removal, and storage, of two liquid layers of different density comprising:

a tank shell having a bottom, a side wall extending upwardly from the bottom, a roof supported at least in part by the side wall and at least one vertical tubular column extending upwardly from the shell bottom to at least close to the roof;

a substantially horizontal first liquid distributor plate means formed of assembled sections above which the column extends and spaced above the shell bottom;

a plurality of first openings in the column between the first liquid distributor means and the shell bottom;

a high density liquid conduit extending from outside the shell into communication with the column interior whereby high density liquid can be fed to the column interior and then flow out the first opening means into the lower portion of the tank beneath the first distributor means and the high density liquid can be withdrawn from the first tank through the first opening means and then through the high density liquid conduit;

a substantially horizontal second liquid distributor means above and below which the column extends and with the second liquid distributor means spaced below the shell roof;

second opening means in the column between the second liquid distributor means and the shell roof; and a low density liquid conduit extending from outside the shell into communication with the column interior whereby low density liquid can be fed to the column interior and then flow out the second opening means into the upper portion of the tank above the second liquid distributor means while high density liquid is withdrawn from the tank through the high density liquid conduit, and the low density liquid can be withdrawn from the tank through the second opening means and then through the low density liquid conduit while the high density liquid is fed to the tank through the high density liquid conduit.

25. A method for the simultaneous addition and removal of two liquid layers of different density to and from an enclosed storage tank;

the storage tank constituting a tank shell having a bottom, a side wall extending upwardly from the bottom, a roof supported by the side wall and at least one vertical tubular column extending upwardly from the shell bottom to the roof; a substantially horizontal first liquid distributor means above which the column extends and spaced above the shell bottom; first opening means in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; second opening means in the column between the second liquid distributor means and the shell roof; a vortex breaker assembly, above which the column extends, positioned above but adjacent the second opening means; and a low density liquid conduit extending from outside the shell into communication with the column interior;

the tank having a stratified volume of low density liquid on top of a volume of high density liquid;

the method comprising feeding high density liquid through the high density liquid conduit to the column interior so that it can flow out the first opening means into the lower portion of the tank beneath the first liquid distributor means while simultaneously withdrawing low density liquid from the tank above the second liquid distributor means, through the second opening means and then through the column to the low density liquid conduit while the high density liquid is fed to the tank through the high density liquid conduit.

26. A method for the simultaneous addition and removal of two liquid stratified volumes of different density to and from an enclosed storage tank;

the storage tank constituting a tank shell having a bottom, a side wall extending upwardly from the bottom, a roof supported at least in part by the side wall and at least one vertical tubular column extending upwardly from the shell bottom to the roof; a substantially horizontal first liquid distributor means above which the column extends and spaced above the shell bottom; a plurality of first openings in the column between the first liquid distributor means and the shell bottom; a high density liquid conduit extending from outside the shell into communication with the column interior; a substantially horizontal second liquid distributor means above and below which the column extends and with the second liquid distribution means spaced below the shell roof; a plurality of second openings in the column between the second liquid distributor means and the shell roof; a vortex breaker assembly, above which the column extends, positioned above but adjacent the second opening means; and a low density liquid conduit extending from outside the shell into communication with the column interior;

the tank having a stratified volume of low density liquid on top of a volume of high density liquid;

the method comprising feeding low density liquid through the low density liquid conduit to the column interior so that it can flow out the second opening means into the upper portion of the tank above the second liquid distributor means while simultaneously withdrawing high density liquid from the tank below the first liquid distributor means and through the second opening means and then through the column to the high density liquid conduit while the low density liquid is fed to the tank through the low density liquid conduit.

27. A method for the simultaneous addition and removal of two liquid layers of different density to and from an enclosed storage tank;

the storage tank constitutes a tank shell having a bottom, a side wall extending upwardly from the bottom, a roof supported by the side wall and at least one vertical tubular column extending upwardly from the shell bottom to the roof; a substantially horizontal first liquid distributor means above which the column extends and spaced above the shell bottom; first opening means in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; second opening means in the column between the second liquid distributor means and the shell roof; a low density liquid conduit extending from outside the shell into communication with the column interior; a bulkhead positioned inside the column to prevent the low density liquid from contacting the high density liquid in the column and the high density liquid conduit communicates with the column below the bulkhead and the low density liquid conduit communicates with the column above the bulkhead;

the tank having a stratified volume of low density liquid on top of a volume of high density liquid;

the method comprising feeding high density liquid through the high density liquid conduit to the column interior so that it can flow out the first opening means into the lower portion of the tank beneath the first liquid distributor means while simultaneously withdrawing low density liquid from the tank above the second liquid distributor means, through the second opening means and then through the column to the low density liquid conduit while the low density liquid is fed to the tank through the high density liquid conduit.

28. A method for the simultaneous addition and removal of two liquid stratified volumes of different density to and from an enclosed storage tank;

the storage tank constituting a tank shell having a bottom, a side wall extending upwardly from the bottom, a roof supported at least in part by the wall and at least one vertical tubular column extending upwardly from the shell bottom to the roof; a substantially horizontal first liquid distributor means above which the column extends and spaced above the shell bottom; a plurality of first openings in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; a plurality of second openings in the column between the second liquid distributor means and the shell roof; and a low density liquid conduit extending from outside the shell into communication with the column interior; a bulkhead positioned inside the column to prevent the low density liquid from contacting the high density liquid in the column; and the high density liquid conduit communicates with the column below the bulkhead and the low density liquid conduit communicates with the column above the bulkhead;

the tank having a stratified volume of low density liquid on top of a volume of high density liquid;

the method comprising feeding low density liquid through the low density liquid conduit to the column interior so that it can flow out the second opening means into the upper portion of the tank above the second liquid distributor means while simultaneously withdrawing high density liquid from the tank below the first liquid distributor means and through the second opening means and then through the column to the high density liquid conduit while the low density liquid is fed to the tank through the low density liquid conduit.

29. A method for the simultaneous addition and removal of two liquid layers of different density to and from an enclosed storage tank;

the storage tank constituting a tank shell having a bottom, a side wall extending upwardly from the bottom, a roof supported by the side wall and at least one vertical tubular column extending upwardly from the shell bottom to the roof; a substantially horizontal first liquid distributor means above which the column extends and spaced above the shell bottom; first opening means in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; second opening means in the shell roof; a low density liquid conduit extending from outside the shell into communication with the column interior; the column including a pair of piping Tee fittings with the high density liquid conduit communicating with one of the Tees and the low density liquid conduit communicating with the other Tee;

the tank having a stratified volume of low density liquid on top of a volume of high density liquid;

the method comprising feeding high density liquid through the high density liquid conduit to the column interior so that it can flow out the first opening means into the lower portion of the tank beneath the first liquid distributor means while simultaneously withdrawing low density liquid from the tank above the second liquid distributor means, through the second opening means and then through the column to the density liquid conduit while the high density liquid is fed to the tank through the high density liquid conduit.

30. A method for the simultaneous addition and removal of two liquid stratified volumes of different density to and from an enclosed storage tank;

the storage tank constituting a tank shell having a bottom, a side wall extending upwardly from the bottom, a roof supported at least in part by the side wall and at least one vertical tubular column extending upwardly from the shell bottom to the roof; a substantially horizontal first liquid distributor means above which the column extends and spaced above the shell bottom; a plurality of first openings in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; a plurality of second openings in the column between the second liquid distributor means and the shell roof; a low density liquid conduit extending from outside the shell into communication with the column interior; the column including a pair of piping Tee fittings with the high density liquid conduit communicating with one of the Tees and the low density liquid conduit communicating with the other Tee;

the tank having a stratified volume of low density liquid on top of a volume of high density liquid;

the method comprising feeding low density liquid through the low density liquid conduit to the column interior so that it can flow out the second opening means into the upper portion of the tank above the second liquid distributor means while simultaneously withdrawing high density liquid from the tank below the first liquid distributor means and through the second opening means and then through the column to the high density liquid conduit while the low density liquid is fed to the tank through the low density liquid conduit.

31. A method for the simultaneous addition and removal of two liquid layers of different density to and from an enclosed storage tank;

the storage tank constituting a tank shell having a bottom, a side wall extending upwardly from the bottom, a roof supported by the side wall and at least one vertical tubular column extending upwardly from the shell bottom to the roof; a substantially horizontal first liquid distributor plate means formed of assembled sections above which the column extends and spaced above the shell bottom; first opening means in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; second opening means in the column between the second liquid distributor means and the shell roof; and a low density liquid conduit extending from outside the shell into communication with the column interior;

the tank having a stratified volume of low density liquid on top of a volume of high density liquid;

the method comprising feeding high density liquid through the high density liquid conduit to the column interior so that it can flow out the first opening means into the lower portion of the tank beneath the first liquid distributor means while simultaneously withdrawing low density liquid from the tank above the second liquid distributor means, through the second opening means and then through the column to the low density liquid conduit while the high density liquid is fed to the tank through the high density liquid conduit.

32. A method for the simultaneous addition and removal of two liquid stratified volumes of different density to and from an enclosed storage tank;

the storage tank constituting a tank shell having a bottom, a side wall extending upwardly from the bottom, a roof supported at least in part by the side wall and at least one vertical column extending upwardly from the shell bottom to the roof; a substantially horizontal first liquid distributor plate means formed of assembled sections above which the column extends and spaced above the shell bottom; a plurality of first openings in the column between the first liquid distributor means and the shell bottom; a high density liquid conduit extending from outside the shell into communication with the column interior; a substantially horizontal second liquid distributor means above and below which the column extends and with the second liquid distributor means spaced below the shell roof; a plurality of second openings in the column between the second liquid distributor and the shell roof; and a low density liquid conduit extending from outside the shell into communication with the column interior;

the tank having a stratified volume of low density liquid on top of a volume of high density liquid;

the method comprising feeding low density liquid through the low density liquid conduit to the column interior so that it can flow out of the second opening means into the upper portion of the tank above the second liquid distributor means while simultaneously withdrawing high density liquid from the tank below the first liquid distributor means and through the second opening means and then through the column to the high density liquid conduit while the low density liquid is fed to the tank through the low density liquid conduit.

* * * * *

UNITED STATES PATENT AND TRADEMARK OFFICE
CERTIFICATE OF CORRECTION

PATENT NO. : 4,987,922

DATED : January 29, 1991

INVENTOR(S) : John S. Andrepont et al

It is certified that error appears in the above-identified patent and that said Letters Patent is hereby corrected as shown below:

On the title page, item [56]:

In the patent face sheet, under "U.S. Patent Documents" insert:

| | | | |
|---|---|---|---|
| 3,552,435 | 1-1971 | Andersson et al | 137/592 |
| 4,590,992 | 5-1986 | Tamblyn | 137/592X |
| 2,732,071 | 1-1956 | Crow | 137/592X |
| 3,084,472 | 4-1963 | Feik | 137/592X |
| 3,757,813 | 9-1973 | Levenberg | 137/172 |
| 4,161,963 | 7-1979 | Stevens | 137/592 |
| 4,571,948 | 2-1986 | Orenstein | 137/592X |

column 8, line 11, change "The" to -- the --; line 15, change "portions" to -- portion --; column 9, line 42, after "vortex" insert -- breaker --; column 10, line 18, after "vortex" insert -- breaker --; line 66, after "second" insert -- liquid --; column 11, line 29, change "portions" to -- portion --; column 12, line 55, delete "first"; column 14, line 22, change "constitutes" to -- constituting --; line 43, after "column" insert -- ; --; line 66, before "wall" insert -- side --; column 15, line 53, before "shell roof" insert -- column between the second liquid distributor means and the --; column 16, line 2, before "density" insert -- low --;

UNITED STATES PATENT AND TRADEMARK OFFICE

CERTIFICATE OF CORRECTION

PATENT NO. : 4,987,922

DATED : January 29, 1991

INVENTOR(S) : John S. Andrepont et al

It is certified that error appears in the above-identified patent and that said Letters Patent is hereby corrected as shown below:

Column 17, line 20, before "column" insert -- tubular --.

Signed and Sealed this

Fourteenth Day of July, 1992

*Attest:*

DOUGLAS B. COMER

*Attesting Officer*

*Acting Commissioner of Patents and Trademarks*